(12) United States Patent
Muttreja

(10) Patent No.: US 12,386,907 B2
(45) Date of Patent: Aug. 12, 2025

(54) SYSTEM AND METHOD FOR DATA MANAGEMENT IN A DISTRIBUTED DATA MESH FOR 5G-WIRELESS VIRTUALIZED DEPLOYMENT

(71) Applicant: DISH Wireless L.L.C., Englewood, CO (US)

(72) Inventor: Madhuri Muttreja, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

(21) Appl. No.: 17/903,786

(22) Filed: Sep. 6, 2022

(65) Prior Publication Data

US 2023/0075794 A1    Mar. 9, 2023

Related U.S. Application Data

(60) Provisional application No. 63/241,404, filed on Sep. 7, 2021.

(51) Int. Cl.
    *G06F 16/951*    (2019.01)
(52) U.S. Cl.
    CPC ............................... *G06F 16/951* (2019.01)
(58) Field of Classification Search
    None
    See application file for complete search history.

(56) References Cited

U.S. PATENT DOCUMENTS

| | | | |
|---|---|---|---|
| 9,092,476 B2 * | 7/2015 | Ghosh | G06F 16/24 |
| 10,075,387 B1 * | 9/2018 | Avasol | H04L 67/51 |
| 11,778,025 B1 * | 10/2023 | Kukreja | G06F 16/2393 |
| | | | 709/238 |
| 11,968,093 B1 * | 4/2024 | Gu | H04L 41/0893 |
| 2009/0099852 A1 * | 4/2009 | Ouimet | G06Q 30/0281 |
| | | | 705/346 |
| 2015/0161671 A1 | 6/2015 | Watkeys | |
| 2015/0169624 A1 * | 6/2015 | Gupta | G06F 16/951 |
| | | | 707/610 |
| 2018/0113707 A1 * | 4/2018 | Mora López | G06F 9/30123 |
| 2018/0232817 A1 | 8/2018 | Isaacson et al. | |
| 2019/0042790 A1 | 2/2019 | Shrinivasan et al. | |
| 2019/0089721 A1 | 3/2019 | Pereira et al. | |
| 2020/0110781 A1 * | 4/2020 | Staszak | G06F 16/9538 |
| 2020/0228551 A1 | 7/2020 | Dalal et al. | |
| 2020/0287977 A1 * | 9/2020 | Cui | H04L 67/51 |

(Continued)

OTHER PUBLICATIONS

International Search Report and Written Opinion, mailed Nov. 24, 2022, for International Patent Application No. PCT/US2022/042652. (16 pages).

(Continued)

*Primary Examiner* — Kris E Mackes
(74) *Attorney, Agent, or Firm* — Seed IP Law Group LLP

(57) ABSTRACT

A distributed data mesh system for networks is described herein. The distributed data mesh system includes data organized into separate domains, where each domain includes one or more data products representing the data in the domain. The distributed data mesh system additionally includes a data infrastructure catalog that includes information describing the data products and data domains. The distributed data mesh system is also designed based on a set of governing principles which govern how data is created, used, and maintained.

20 Claims, 11 Drawing Sheets

(56) References Cited

U.S. PATENT DOCUMENTS

| | | | |
|---|---|---|---|
| 2020/0310394 A1* | 10/2020 | Wouhaybi | H04L 41/0846 |
| 2020/0409967 A1* | 12/2020 | Caldwell | G06F 16/951 |
| 2021/0064489 A1 | 3/2021 | Robillard et al. | |
| 2021/0144517 A1 | 5/2021 | Guim Bernat et al. | |
| 2021/0153001 A1* | 5/2021 | Eisner | H04W 4/90 |
| 2021/0203550 A1* | 7/2021 | Thakkar | H04L 67/141 |
| 2021/0204200 A1* | 7/2021 | Krishan | H04W 48/16 |
| 2022/0014947 A1 | 1/2022 | Smith et al. | |
| 2022/0159010 A1 | 5/2022 | Bandarupalli et al. | |
| 2022/0247678 A1 | 8/2022 | Atwal et al. | |

OTHER PUBLICATIONS

Non-Final Office Action, dated Jan. 31, 2024 for U.S. Appl. No. 17/975,397, 20 pages.

Final Office Action, dated Jun. 18, 2024 for U.S. Appl. No. 17/975,397, 14 pages.

* cited by examiner

SYSTEM AND METHOD FOR DATA MANAGEMENT IN A DISTRIBUTED DATA MESH FOR 5G-WIRELESS VIRTUALIZED DEPLOYMENT

CROSS-REFERENCE TO RELATED APPLICATION(S)

This application claims the benefit and priority to U.S. Application No. 63/241,404, filed Sep. 7, 2021, the entirety of which is hereby incorporated by reference.

BACKGROUND

Mobile network designs are typically complicated because they provide a service that operates seamlessly with mobility and roaming. Virtualization and cloud-native designs offer flexibility and potential cost savings; however, these practices greatly increase the complexity of managing these networks. Furthermore, data generated across the network requires extensive management to be used well. Without proper data management, data losses become an expensive issue both from a network resource perspective and cost perspective, because additional resources must be used to recover, make up for, find, etc., lost data.

It is with respect to these and other considerations that the embodiments described herein have been made.

BRIEF SUMMARY

Mobile networks, and the components that make up the network infrastructure, such as towers, data centers, etc. ("network infrastructure components"), produce and consume large amounts of data in order to ensure that a network—such as a telephone network, mobile network, 5G/4G network, and other networks—can span regions, nations, internationally, etc. (collectively "mobile networks"). Mobile networks are typically designed to provide seamless operation and service alongside mobility and roaming for their users. However, these mobile networks require extensive data management, virtualization, and cloud-roaming, among other techniques to manage the vast amount of data generated and travelling through the mobile network. Furthermore, storing, managing, and accessing the data is difficult because the data is generated across the network, by every device and network infrastructure component. The current techniques may lead to data loss, which may cause issues in the service provided to consumers and cause additional resources to be expended to remedy issues caused by the issues.

The embodiments disclosed herein address the issues above and thus help solve the above technical problems and improve the technology of mobile network and network infrastructure by providing a technical solution that manages and organizes the data consumed and produced across a network through the use of a distributed data mesh system. The embodiments disclosed herein are further able to prevent data from being moved away from the devices, network infrastructure components, etc., which generate and frequently access the data. Furthermore, the embodiments disclosed herein ensure that the data is accessed, produced, consumed, received, etc., in such a way that conforms with standards, such as standards defined by a network owner, a regulatory agency, a standards setting organization, or another entity which creates data standards.

In some embodiments, a distributed data mesh system identifies a plurality of data domains within a network, wherein data associated with each respective data domain of the plurality of data domains is stored within a data pool of a plurality of data pools. For each data domain, the distributed data mesh system may identify at least one data product associated with the respective data domain and obtain information defining the at least one data product from the data product. The data product may be stored within a data pool associated with the respective data domain. The distributed data mesh system may receive an indication that a data product is to be accessed by a computing device and cause, based on the information defining the data product, the computing device to provide first data to the data product. The distributed data mesh system may cause the data product to output a response based on the first data without moving the data product outside of the data pool within which the data product is stored.

In some embodiments, the distributed data mesh system receives an indication that a computing device associated with a respective data domain of the plurality of data domains has generated second data associated with a data product included in the respective data domain. The distributed data mesh system may cause the second data to be stored within the data pool which stores, includes, etc., the respective data domain. The distributed data mesh system may prevent the generated second data from being stored within a data pool which is not the respective data pool.

In some embodiments, the distributed data mesh system causes a crawler to access a data domain to locate data products within the data domain. The distributed data mesh system may receive an indication of one or more data products from the crawler. An indication of a data product received from the crawler may include one or more of: a publishing port of the data product, a consumption port of the data product, information describing the contents of the data product, or other information or data associated with the data product. The crawler may audit a data product by comparing one or more of: the contents of the data product, a format of data consumed or published by the data product, a description of the data product, one or more services provided by the data product, or other information associated with the data product to one or more predefined standards.

In some embodiments, the each data domain represents one or more network infrastructure components, network functions, or other aspects of a telecommunications network. For example, a data domain may represent one or more of: a network slice, a radio access network for a pre-defined geographic area, a telecommunication network function, a roaming telecommunication network, user data for users within a certain geographic area, regulatory data for the telecommunication network, telecommunication network security services or functions, or other aspects of a telecommunication network.

In some embodiments, the distributed data mesh system generates a data catalog based on information defining data products included in a plurality of data domains. The distributed data mesh system may cause the data catalog to be accessible to one or more computing devices, such that the computing devices can locate and properly access data products defined in the data catalog.

In some embodiments, a computing device generates a data product which includes an indication of a data domain related to the computing device. The computing device may identify a first data pool for the data product based on the data domain and one or more pre-defined rules. The computing device causes the data product to be stored within a storage device associated with the first data pool.

In some embodiments, the computing device accesses a data catalog and receives information regarding how to access data stored in a particular data product. The data catalog may include information defining a plurality of data products, each data product being stored within a data pool of a plurality of data pools. The computing device may access the data catalog to obtain information regarding how to access data stored within a data product. The computing device may locate the particular data product via the data catalog. The computing device may transmit a request to access the particular data product based on the information regarding how the computing device accesses the particular data product. The computing device receives a response to the request, the response including data associated with the data product such that receiving the response does not include moving an instance of the data product to another computing device.

In some embodiments, when generating the data product, the computing device generates information regarding the data product based on the contents of the data product. The information regarding the data product may be included within the contents of the data product.

In some embodiments, when generating the data product, the computing device generates a consumption port indicating at least one format for data provided to the data product. In some embodiments, when generating the data product, the computing device generates publishing port, the publishing port including at least one format for data output by the data product.

In some embodiments, to identify the first data pool, the computing device receives an indication of a plurality of data pools, the indication of the data pools including an indication of a location of one or more storage devices storing each data pool of the plurality of data pools. The storage devices may store all or part of a data pool. The computing device may receive an indication of its location. The computing device may identify the first data pool based on a comparison of the location of the computing device and the location of the one or more storage devices.

In some embodiments, the computing device is a computing devices associated with at least one aspect of a telecommunication network, including one or more of: a network slice, a radio access network for a pre-defined geographic area, a telecommunication network function, a roaming telecommunication network, user data for users within a certain geographic area, regulatory data for the telecommunication network, telecommunication network security services or functions, or other aspects of a telecommunication network.

In some embodiments, the computing device generates an updated version of the data product. The computing device may cause the updated version of the data product to be stored in a data pool which hosts a current version of the data product, such that the current version of the data product is replaced by the updated version of the data product. The computing device may cause the updated version of the data product to replace the current version of the data product in such a manner that neither the updated version of the data product nor the current version of the data product are transmitted or stored in another data pool of the plurality of data pools.

DETAILED DESCRIPTION

Figure 1:
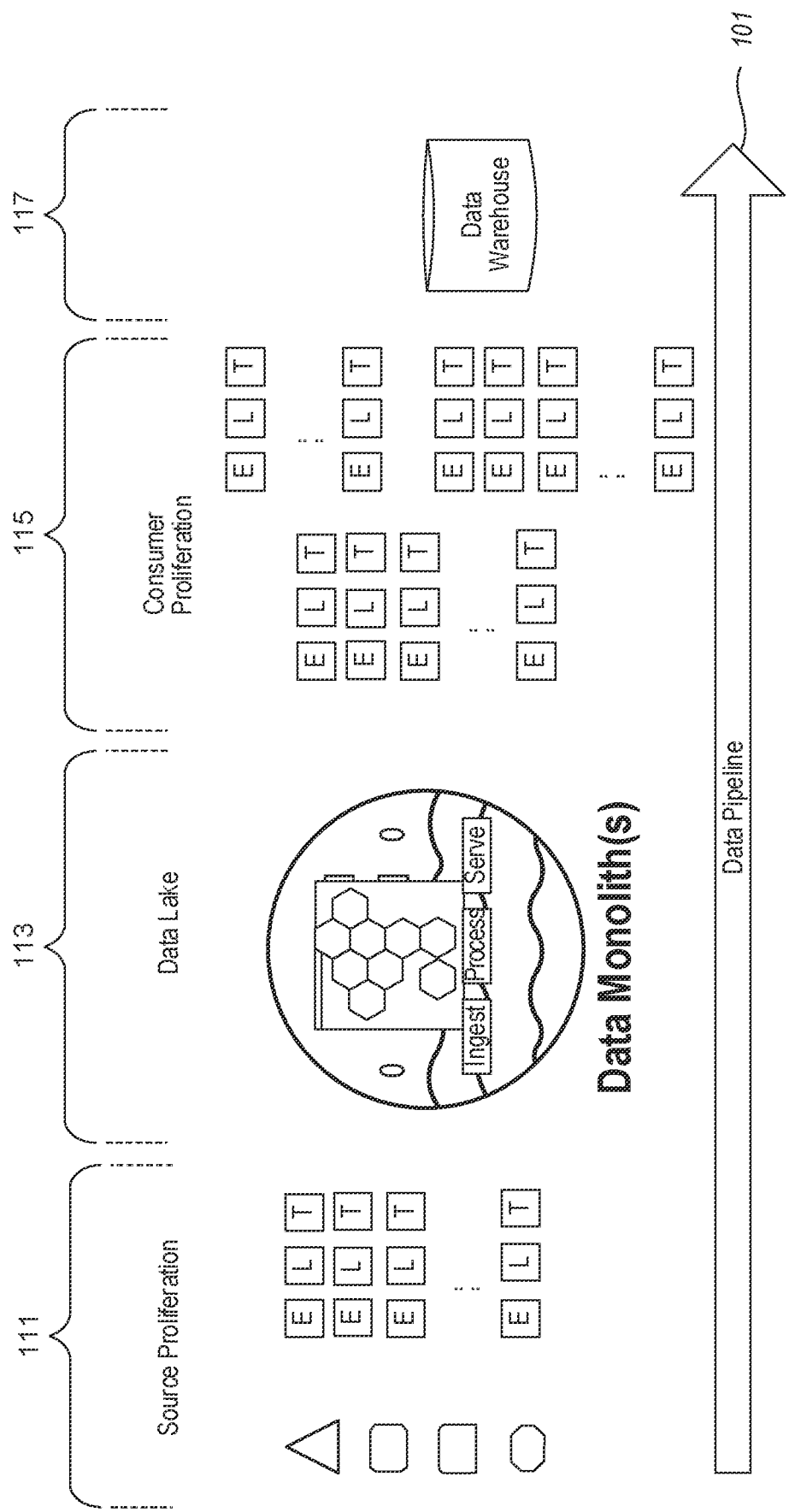
FIG. 1 is a diagram depicting the problems caused by the current methods and systems that use data lakes.

Mobile networks, and the components that make up the network infrastructure, such as towers, data centers, etc. ("network infrastructure components"), produce and consume large amounts of data in order to ensure that a network, such as a telephone network, mobile network, 5G/4G network, and other networks which can span regions, nations, internationally, etc. (collectively "mobile networks"). Mobile networks are typically designed to provide service which provides seamless operation alongside mobility and roaming for their users. However, these mobile networks require extensive data management, virtualization, and cloud-roaming, among other techniques to manage the vast amount of data generated and travelling through the mobile network. Furthermore, storing, managing, and accessing the data is difficult because the data is generated across the network, by every device and network infrastructure component. The current techniques may lead to data loss, which may cause issues in the service provided to consumers and cause additional resources to be expended to remedy issues caused by the issues.

A common remedy is to use data lakes to centralize data. A data lake is a data store which stores large amounts of data in its raw form in a central location, However, excess use of data lakes may lead to problems accessing the data stored in the data lakes for a variety of reasons. For example, the data lakes may be unable to provide quick access to data when they store large amounts of data, data may be lost when data lakes store large amounts of data due to hardware or software failures, the data may be disorganized which makes it hard to find, etc. Further, the data lakes typically cause "Architecture Sprawl" because of all of the hardware and data centers required to maintain the data lakes. The data lakes may be used to create a data platform which is distributed across many lakes, however, these data platforms are each monoliths which lead to problems with data movement and centralization of the data within certain regions, data lakes, etc. The extensive amount of data movement required to maintain a network additionally causes further issues with current data platforms, data lakes, etc. Furthermore, all of these problems are exacerbated by the advent of 5G networks, which are highly distributed networks with data being generated at many points across the network, and moved to many points across the network.

Additionally, the use of multiple data lakes often leads to the same data being stored multiple times in different places. As a result, when the data is updated, each instance of the data must be found and updated in order to ensure data which is out of date is not stored. If each instance of data is not located and updated a device, network infrastructure component, etc., (the "device") that accesses the data may receive data which is out-of-date. This can additionally cause further issues, as the device may use the out-of-date data to make a decision or generate other data which is passed on to yet another device, and so on, potentially causing network-wide issues.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed to include "and/or" unless the content clearly dictates otherwise.

The headings and Abstract of the Disclosure provided herein are for convenience only and do not interpret the scope or meaning of the embodiments.

In the present application, a "device" may be a computing device, network infrastructure component, computing hardware, or any other device or network component that may access or interact with a network.

FIG. 1 is a diagram depicting the problems caused by the current methods and systems which use data lakes. In FIG. 1, data is created at its source (source proliferation 111) and moves along the data pipeline 101. The next stage in the pipeline is the data lake 113, or data lakes, which store all of the data created and used by the network. This can lead to "data monoliths" which store so much data that data may be lost, accessing the data is more difficult, accessing data takes longer, etc. The data then is used, or accessed, by the network to provide data to computing devices which use or "consume" data on the network at the consumer proliferation stage 115. Eventually, the data may end up at a data warehouse 117 to create a centralized location for the data. The centralized aspect of data movement can lead to large amounts of congestion and bottlenecks as data flows through the pipeline because all of the data must take the same route.

Additionally, even though the data ends up existing at a data warehouse 117, an instance of the data may still exist at each stage in the data pipeline 101. Furthermore, this method leads to centralization of domain knowledge, as each source that produces data may be managed by a different team, or even by a party other than the network owner or consumer (i.e. a "third party").

The embodiments disclosed herein address the issues above and thus help solve the above technical problems and improve the technology of mobile networks and network infrastructure by providing a technical solution that provides a distributed data mesh system, which is a network-scale data mesh and micro-services to allow network nodes to access data. The embodiments disclosed herein also improve customer experience and service to maintain a network which improve SLAs. The embodiments disclosed herein additionally provide improvements to 5G networks to provide a distributed data mesh architecture for a 5G network.

The embodiments disclosed herein are able to improve the functioning of devices, network components, and other hardware which interact with a network, such as a 5G network. For example, the embodiments disclosed herein are able to ensure that data is stored in one place near to where the data is created. By ensuring data is stored close to where it is created, the data is prevented from having to travel great distances to be used by the devices, network components, or hardware which access particular data the most, thus decreasing latency, as well as decreasing the processing power, bandwidth, and other computing resources required to transmit the data across great distances and, potentially, through multiple devices to arrive at its destination. Furthermore, by ensuring that data is stored in one location, rather than multiple locations, the embodiments disclosed herein prevent redundant data from being created, and thereby prevent issues where data stored in one location is updated and the same data stored in another location is not updated. Thus, by ensuring each instance of data is stored in a single location, storage space across the entire network is not wasted by the storage of redundant instances of data. Additionally, ensuring each instance of data is stored in a single location conserves computing resources which would have to be used to locate and update each redundant instance of data when an instance of data changes.

The embodiments disclosed herein further improve the functioning of devices, network components, and other hardware which interact with a network by packaging microservices with data to create a "data product." The packaged microservices are able to protect the data stored in the data product by controlling access to the data and providing outputs to the devices, network components, and other hardware without altering the data stored in the data product, or allowing such devices, components, or hardware to do so. As a result, the data cannot be inadvertently altered, which may cause a cascading problems across the entire network. Furthermore, the embodiments disclosed herein provide a data catalog which includes information describing each data product, how the data within the data product is accessed, the location of the data product, etc. By providing such a data catalog, devices, network components, and other hardware which interact with a network are able to conserve computing resources spent to locate data on the network. Such devices, network components, and hardware may also conserve computing resources which would be spent unsuccessfully attempting to access the data because the data catalog is able to directly provide instructions regarding the access of the data.

Thus, by using the aspects of the distributed data mesh system described herein, the distributed data mesh system is able to manage the spread of data along an entire network while providing complete data visibility and data transparency. The distributed data mesh system is also able to manage the spread of data while minimizing architecture sprawl. The distributed data mesh system is further able to avoid the loss of knowledge, special training, and the creation of "hyper teams" which need master and learn the various data policies, products, etc., for the network owner, as well as for any third parties, in order to manage the network.

In some embodiments, the distributed data mesh system is implemented as part of a 5G network. The distributed data mesh system may utilize the characteristics and design principles of 5G standards, including where software is a core aspect of the network. Furthermore, the distributed data mesh system is able to provide these improvements within the anticipated zeta-byte scale of the 5G network.

Figure 2:
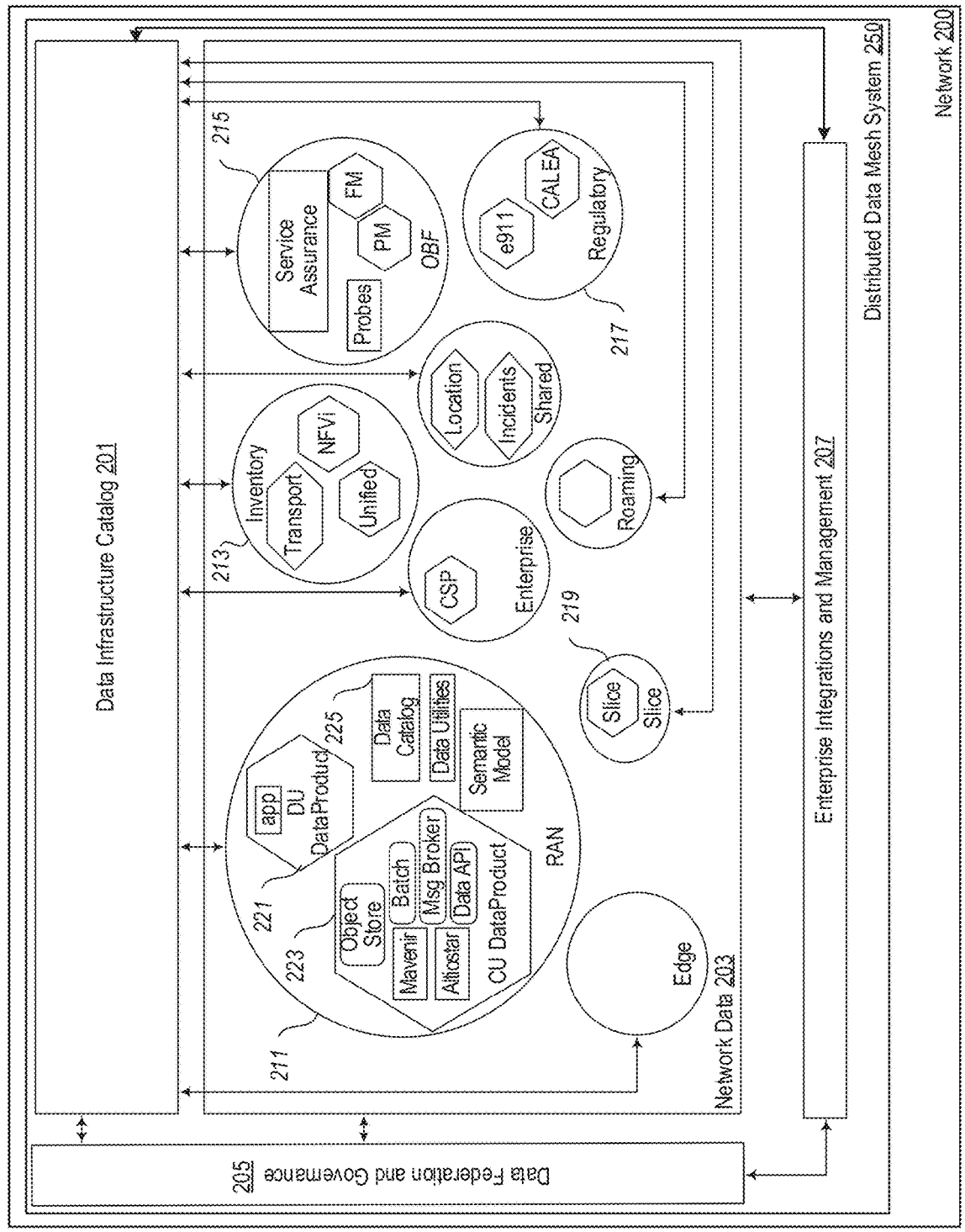
FIG. 2 is a display diagram depicting components used in a distributed data mesh system to provide data management at the scale of a 5G network, according to various embodiments described herein.

FIG. 2 is a display diagram depicting components used in a distributed data mesh system 250 to provide data management at the scale of a 5G network, according to various embodiments described herein. The distributed data mesh system 250 includes four main sections: the data infrastructure catalog 201, network data 203, data federation and governance 205, and enterprise integrations and management 207. The distributed data mesh system 250 may include one or more devices, such as the network infrastructure component 400 described below in connection with FIG. 4, which perform the operations of the distributed data mesh system 250. The operations of the distributed data mesh system 250 may include generating, maintaining, changing, etc., the network data 203, data infrastructure catalog 201, the data federation and governance 205, the enterprise integrations and management 207, as well as any of the operations and processes described in connection with FIGS. 3A-10. The one or more devices which perform the operations of the distributed data mesh system 250 may be devices which are dedicated to performing the operations of the distributed data mesh system 250, devices which primarily perform tasks or functions in the network 200 other than the tasks or functions related to the distributed data mesh system 250, devices which access the network 200, or some combination thereof.

The enterprise integrations and management 207 include functions and services provided at the network (enterprise) level to manage the data in the network. These functions and services include, but are not limited to: data operations ("data ops"); message brokers, such as Kafka; observability frameworks (OBF); token as a service ("TaaS"); continuous integration/continuous delivery ("CI/CD"); one or more orchestrators; and other functions or services related to managing, providing, implementing, etc., a large-scale data network.

The distributed data mesh system 250 defines data domains as a separate plane from the functional components of the network, as illustrated by the network data 203. The network data 203 includes data domains, such as the RAN domain 211, inventory domain 213, OBF domain 215, regulatory domain 217, and slice domain 219. Each of the data domains are used to separate the data into groups which support the functional applications of the network, data curation processes of the network, self-describe the data produced by the network, etc. Each data domain includes one or more data products which can be used to support other data domains, provisioned for other data domains, accessed by other data domains, etc. The data products may be or include "microservices," which are services or applications within a data product that perform operations on the data stored in the data product, with a polyglot architecture used to support data classes represented by the data products. Furthermore, as illustrated by FIG. 2, this data organization de-centralizes data ownership and management, provides ports for operational data, analytics data, or other data access needs, and treats data domains as "first-class citizens." Treating a data domain as a first-class citizen includes giving the data domain a similar importance, priority, etc., as other parts of an organization's operational model, data model, etc., such as data operations and data security.

In some embodiments, each data domain, such as the data domains described in FIG. 2, is stored in a "data pool." A data pool is a data storage concept in which a small amount of data related to a particular use or aspect of a system is stored, and data pools may be stored in different geographical location's. This is in contrast with a data lake which stores large amounts of data for varying functions, uses, and aspects of a system in a central location. The data pool may include one data domain, multiple data domains, etc. A data pool may be geographically located near network infrastructure components which are related to a data domain stored in the data pool.

In FIG. 2, the RAN domain 211 includes data related to a radio-access-network provided by the network 200, according to various embodiments described herein. The inventory domain 213 includes data related to network inventory, such as network infrastructure components or other components of a network. The OBF domain 215 includes data related to the observability framework used by the network 200 to collect data related to one or more network functions. The regulatory domain 217 includes data related to services provided as a result of government regulations of the network, such as providing 911 services, providing services to law enforcement, or other services related to government regulations. The slice domain 219 includes data related to one or more network slices.

In some embodiments, the network data 203 may include one or more of each of the domains 211-219. For example, the radio-access-network associated with the RAN domain 211 may be a radio-access-network that provides networking services to devices in a particular geographic area. Thus, in this example, the network 200 may include multiple RAN domains similar to the RAN domain 211, such that each geographic area covered by the network 200 includes a RAN domain. As another example, the network data 203 may include multiple slice domains 219, such that each network slice provided by the network 200 is associated with at least one slice domain 219.

Each of the data domains in the network data 203, such as data domains 211-219, include data products which regulate access to data included in a data domain. For example, the RAN domain 211 includes the DU data product 221 and CU data product 223. The CU data product 223 includes an object store, batch, message broker, and a data API. The DU data product 221 includes an application. These data products control access to the data included in the RAN domain 211, without moving the data from their storage location.

The distributed data mesh system additionally includes a data infrastructure catalog 201. The data infrastructure catalog 201 includes information related to data domains and the data products included in each data domain, such as definitions of each data product, the data pools in which data domains and data products are stored, and other information related to data domains and data products. The data infrastructure catalog 201 may be generated, maintained, changed, etc., by using one or more crawlers to access each data domain and data product. In some embodiments, the data infrastructure catalog includes one or more "templates" for interacting with one or more data products. The templates may be used by a device to interact with a data product, such as by defining which information is required to receive certain data from a data product, by defining the formats or protocols used by the data product to receive or output data, or other methods for defining or guiding a device's interaction with a data product.

A crawler may collect information regarding individual data products, such as by pushing code to a data product and receiving a response from the data product related to the code. In some embodiments, a crawler "audits" a data product in a similar manner. As part of auditing the data product, the crawler may identify data included in the data product which does not conform to one or more predefined rules, policies, guidelines, etc. ("pre-defined rules"). The distributed data mesh system may cause the non-conforming data to be isolated, such as by making the non-conforming data inaccessible to one or more computing devices, network infrastructure components, or other devices or components, until the data is changed to conform to the pre-defined rules. The pre-defined rules are described in more detail in connection with the data federation and governance 205. The distributed data mesh system may cause the data to be changed to conform to the pre-defined rules, such as by changing the format of the data, the location of the data, alerting a user to the non-conforming data, or other methods of changing data to conform to pre-defined rules.

In an example embodiment, the data infrastructure catalog 201 reduces architecture sprawl by including information regarding microservices configurable to the needs of different network infrastructure components, different data domains, etc. The microservices may be deployed to network infrastructure components at various tiers of the network, including data centers, the edge, in network slices, etc. The example data infrastructure catalog 201 is a self-service catalog, thus making the data accessible without requiring a user to obtain the technical background, in-depth knowledge, etc., needed to access the data. A user, network function, network infrastructure component, or other hardware or device which accesses network data, may access the data infrastructure catalog 201 to obtain the information required to access data included in data domain and data products.

Furthermore, in the example embodiment, the data infrastructure catalog 201 is configuration-driven, and is able to provide and allow for the creation of reusable modular components to access and consume data products, and an interface for accessing those components. The example data infrastructure catalog 201 provides modular services, modular products, etc., used by network infrastructure components or other computing devices or hardware to access data in data products, manipulate data in data products, use data in data products, etc. The example data infrastructure catalog 201 may also allow for a minimization of architecture sprawl by providing centralized tools and tool-sets, enterprise solutions, utilities, and templates. The example data infrastructure catalog 201 may provide: batch pipelines, batch pipelines version 2, real-time pipelines, searching, data operations, monitoring, data audits, logging, object storage, publisher and subscriber ("pub/sub") messaging for the tools, tokenization, encryption, configuration templates, OBF collectors, inventory collectors, address standardizers, service assurance, and other functions, services, etc. The data example infrastructure catalog may additionally include service models for data products to subscribe or embed services in the data products with compatibility across domains and network infrastructure components, as well as versioning.

The distributed data mesh system additionally includes data federation and governance 205. The data federation and governance 205 includes the data policies, security, quality meta data management, master data management, KPI management solutions, data cataloging, etc., (collectively "data governance policies") used by the distributed data mesh system. The data governance policies may be owned and controlled by the network owner. The data governance policies may also provide data "transparency" among devices, such that at least some devices are able to "see" the data stored on at least some other devices. Furthermore, the data governance policies are configured to ensure "one-data," such that wherever data resides in the network, the data is discoverable, creatable, and governed by the data governance policies. The data governance policies may also include mandatory or optional capabilities for each data product, which the data product can use. The data products may also propose tools or technologies as long as the data tools or technologies are interoperable with the data product. The tools and technologies suggested may be subjected to a "vetting process" in order to manage costs and avoid architecture sprawl.

The distributed data mesh may be implemented by using one or more guiding principles, such as those discussed in U.S. Application No. 63/300,586 titled "Systems and Methods for a Distributed Data Platform." The following principles may be guiding principles used in the distributed data mesh to implement the data federation and governance 205.

Under one principle, the owner of the telecom network owns all of the data, including data produced by third parties.

Under another principle, the data is democratized to support agile consumer models, including business and network analytics. Data access may be enforced based on polices, such as security policies, non-disclosure agreements, customer agreements, and other policies which affect the use of data. Domain datasets are distributed, discoverable, and able to be accessed, controlled, and governed by network infrastructure components. Furthermore, all data in the data lake is governed to enable enrichment by data consumers and "reconciliation" by data lake operations.

Another principle states that data agreements are defined with all sources and source types. This may include the data payload, ingest patterns, location of data, intent of onboarding data, etc. Vendors must conform to supported data formats and structures, protocols for data ingestion, and must have integration capabilities with tools defined by the network owner.

According to another principle, the data lake should support the data platform. Supporting the platform may include enabling a variable data structure, assisting with latency, assisting with the volume of data, assisting with the quality of service for users of the network, and assisting with pre-defined or on-demand needs for network infrastructure components.

Another principle states that data should be stored schema-free. Thus, the data is modeled into a fixed schema as late as possible, such as, for example, right before use by a network infrastructure component.

Another principle states that the data platform provides an ecosystem of consumable data products, such as data warehousing, data services, or semantic layers, as independent version-aware terminal points. The data platform also provides consumer models in consumable formats to avoid additional programing for preparation. Furthermore, data computation techniques, modelling, semantic layers, and data feedback is available and independent of the data itself.

Another principle states that the vendors cannot "lock-in" data designs, logic, and dependencies. Thus, data is portable between different hosting environments, frameworks, etc., in an agile manner.

Another principle states that data models and products are to be self-documented and propagated with access to all dependences. The data models and products should be accessible programmatically.

Another principle states that domain driven data products are made available. This may include data, metadata, and semantic data being able to adapt to changes in definition and meaning. Thus, the data is kept independent of the network infrastructure technology and components.

Under one principle, the owner of the telecom network up to one data pool may be used in a network infrastructure component. Under this principle, an additional data pool is not created if a vendor pool covers the entire dataset in a datacenter. Furthermore, one data lake is used by the network owner.

According to another principle, a data pool or data lake is to be placed closer to the source of data and should support fit-for-purpose architectures. The data pool or data lake can support hybrid environments, such as on-prem, public cloud, or other environments for distributed computing and storage architectures. Furthermore, data procurement processes should consider matching stipulations and characteristics to the network owner's data lake or data pools for interactions.

According to another principle, all components and capabilities are to be built modular as microservices. The microservices are to have REST or other enabled interfaces, and should support dynamic configuration of components, like storage, computing, workflows, and frameworks. The microservices should also support capabilities such as, onboarding, instantiation, provisioning, resource scaling, etc. The architecture should be decoupled to allow for flexibility to add or remove components and capabilities as and where needed. Furthermore, the data platform should have a unified orchestration, governance, and metadata paradigm enable architecture across distributed data pools and the data lake. Frameworks and processes within the data platform should be capable to adapt to newer formats and data structures over time.

Another principle states that the architecture should support bi-directional interworking with external niche vendors and frameworks for specialized capabilities, such as databricks, orchestration products for data, metadata, logic, etc., and vendor data pools.

Another principle states that the data lake capabilities and components must be available for self-service including data access, exploration, source onboarding, pipeline designs, scaling, monitoring, performance capabilities, etc. Additionally, the architecture should be able to serve as the backend to support data analytics.

Under another principle, capabilities like data-movement, data-processing, etc. at all data lake components are regulated by the network owner's cost-to-value evaluations. The evaluations are definable and enforceable to all capabilities, components and work-flow tiers. Furthermore, onboarding, ingesting, data movement and processing within a data lake should be driven by a business, consumer, operations, research, or automation use case. The data platform and network infrastructure components should implement and use existing technologies prior to looking for new architectures, technology and tools.

According to another principle, network infrastructure components should be able to securely isolate their capabilities, components, and work-flows, including components under the control of third parties.

According to another principle, data configuration should be driven by active and agile governance for data quality and data security (including de-identification, classification based routing, privilege management) at all levels of data, metadata, processes, and work-flows to support regulatory requirements, compliance requirements, or other customer requirements. The network owner should control all data governance policies, and the governance policies should extend to all customers and systems inter-working with the network's data.

Under another principle, the data platform should include proactive and reactive governance models with version management of the policies at each tier.

Another principle states that the data lake should be highly available and durable, with as little downtime as possible. The tiers of the data lake and their specific requirements may be defined to implement dynamic optimization of services, operations, features, etc. The data lake components and capabilities may be designed to adapt to better technologies over time. The data platform should have a unified orchestration and centralized governance and discoverability for the platform, the distributed data, and the models.

Another principle states that the "dev-ops," continuous integration, and continuous deployment) should be used to automate incident response, performance and cost for reactive and proactive optimizations, code releases, configuration and change management and data migration needs, while preventing data losses and protecting from threats. Furthermore, third parties are to support and manage the lifecycle of their products, partners, open source components, etc.

Another principle states that like new sandboxes, continuous meta orchestration, continuous testing, and continuous monitoring are used by the network owner to manage the quality, cycle-time, or data analytics from data in production. Furthermore, models, such as AI models, machine learning models, and other consumer models should be used for data processing and consumption.

Each of the principles described above may be used in conjunction with one or more other principles. Additionally, the principles may be applied depending on the type of network, the type of data, the location of the data, etc. Furthermore, these principles may be used to define the data governance rules described above in connection with FIG. 2.

Figure 3A:
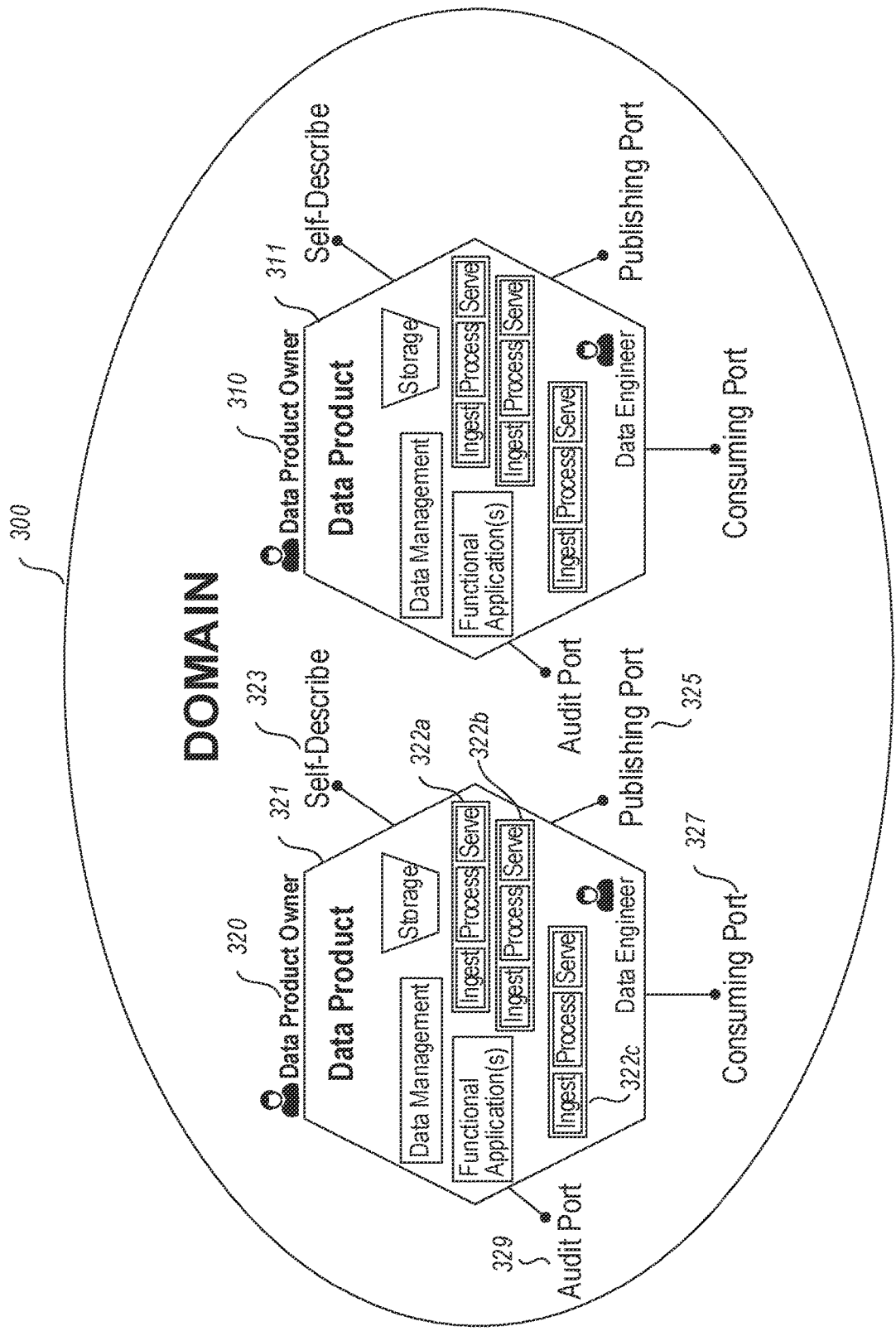
FIG. 3A is a display diagram depicting data products included in a data domain, according to various embodiments described herein.

FIG. 3A is a display diagram depicting data products included in a data domain 300, according to various embodiments described herein. The data domain 300 includes two data products, data product 321 and data product 311. Each of the data products 321 and 311 are associated with a respective data product owner, such as data product owner 320 and data product owner 310. A data product owner is an entity, such as a device, a network engineer, a third-party service provider, etc., that manages and defines the data product. The data product owner may define one or more ports of a data product, the types of data included in the data product, etc., in such a way that the data product conforms with the data governance rules, such as the data governance rules described above in connection with FIG. 2. While the data products 311 and 321 appear similar, they each represent different data included in the data domain, and a data domain may include more or fewer data products than those shown in the data domain 300.

The data product 321 includes functional applications, data management functions, data storage, and microservices 322a-322c. The functional applications represent applications, functions, services, etc., used internally within the data product 321. The data management functions represent functions used to manage the data stored by the data product 321. The data storage represents the data stored by the data product 321. The microservices 322a-322c are provided by the data product 321 to devices, accessed by other devices, etc., through one or more ports of the data product 321. While the data product 321 is shown to include three microservices, the microservices 322a-322c, a data product is able to include more or fewer microservices than the amount depicted in the data product 321.

The data product 321 also includes multiple "ports" such as a self-describe port 323, the publishing port 325, the consuming port 327, and the audit port 329. While the data product 321 is shown to include one of each type of port, other data products may include multiples of certain types of port (not shown), may include other ports of different types (not shown), or may include fewer ports (not shown) than the data product 321. The self-describe port 323 is a port used by the data product 321 to provide information regarding the data included in the data product, the services provided by the data product, how to access or receive data from the data product, or other information used to describe the data product 321. The publishing port 325 is a port used by the data product 321 to output information or data which was requested by a device. The consuming port 327 is a port used by the data product 321 to receive data provided by a device as input. The audit port 329 is a port which can be used to access the data product 321 in order to ensure the data product 321 conforms to data governance rules. In some embodiments, every data product associated with the network includes a self-describe port, such as the self-describe port 323. In some embodiments, each port included in a data product has one or more predefined formats or "protocols" for receiving data, outputting data, etc.

In operation, the data product 321 may receive data from a device at the consuming port 327 along with a request that the data product 321 provide certain data to the device as an output. The data product 321 may route the received data to be ingested and processed by one or more microservices, such as one or more of the microservices 322a-322c. The data product, via the microservice(s), may process the received data, such as by processing the data according to the provided instructions to obtain data output or "served" by the microservice(s). The data product 321 provides the data output by the microservice(s) as the data requested by the device via the publishing port 325. In some embodiments, the device may specify particular microservice(s) which the data product should use to process the data received at the consuming port 327. In some embodiments, the data products determines which microservice(s) are required to process data received at the consuming port based on the data or service requested by the device.

Figure 3B:
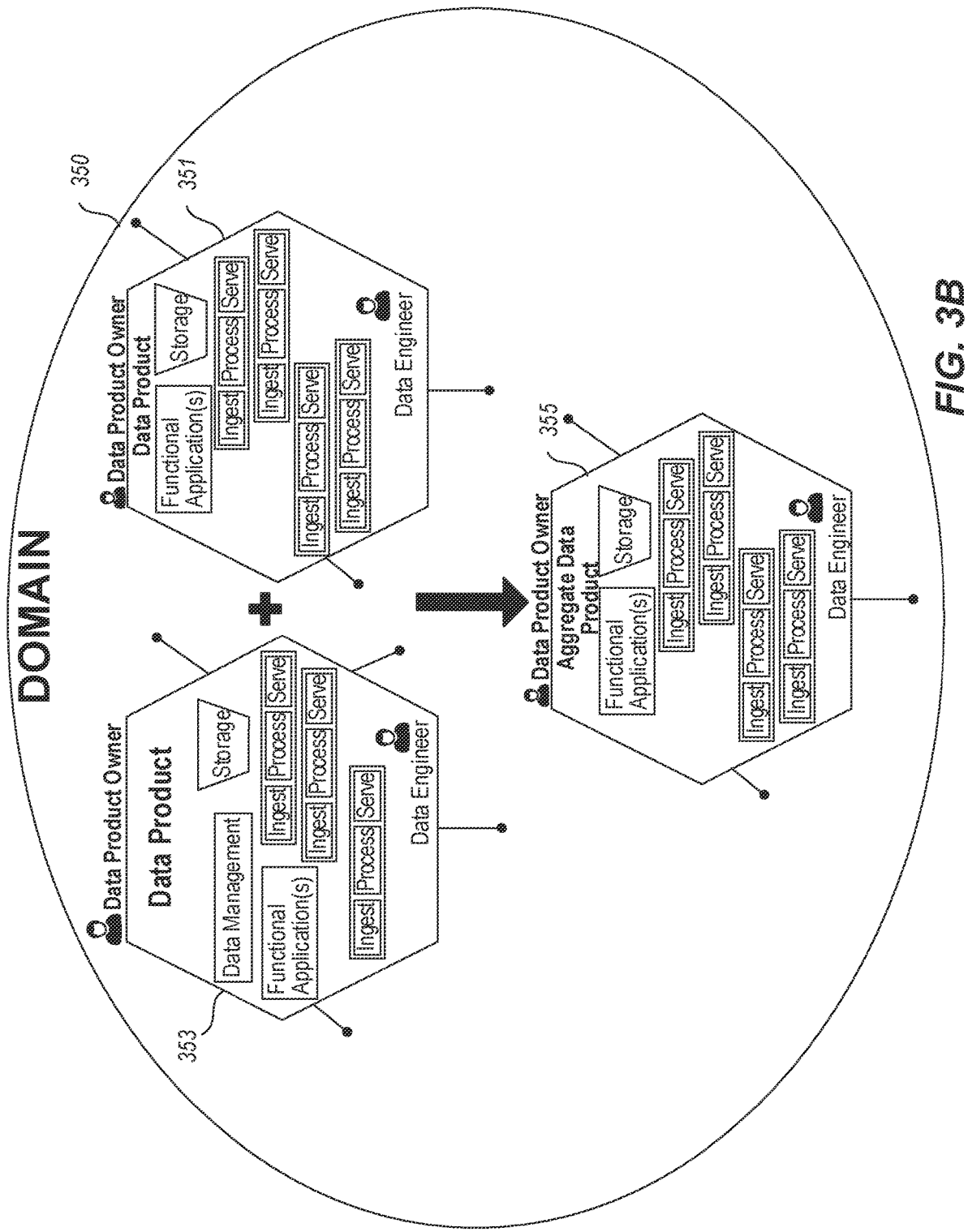
FIG. 3B is a second domain that includes an aggregated data product, according to various embodiments described herein.

FIG. 3B is a second domain 350 which includes an aggregated data product 359, according to various embodiments described herein. The second domain 350 includes a first data product 351, a second data product 353, and an aggregate data product 355. The aggregate data product 355 is a data product which is produced by the distributed data mesh system by aggregating two or more data products, such as the first data product 351 and second data product 353. In some embodiments, an aggregate data product is produced based on data products included in one or more data domains. The aggregate data product 355 may include a portion of the applications, microservices, and data included in the first data product 351 and the second data product 353. The aggregated data product 355 may include applications, microservices, and data which are not included in the first data product 351 and the second data product 353. The aggregated data product may be created by using the process described below in connection with FIG. 6.

Figure 4:
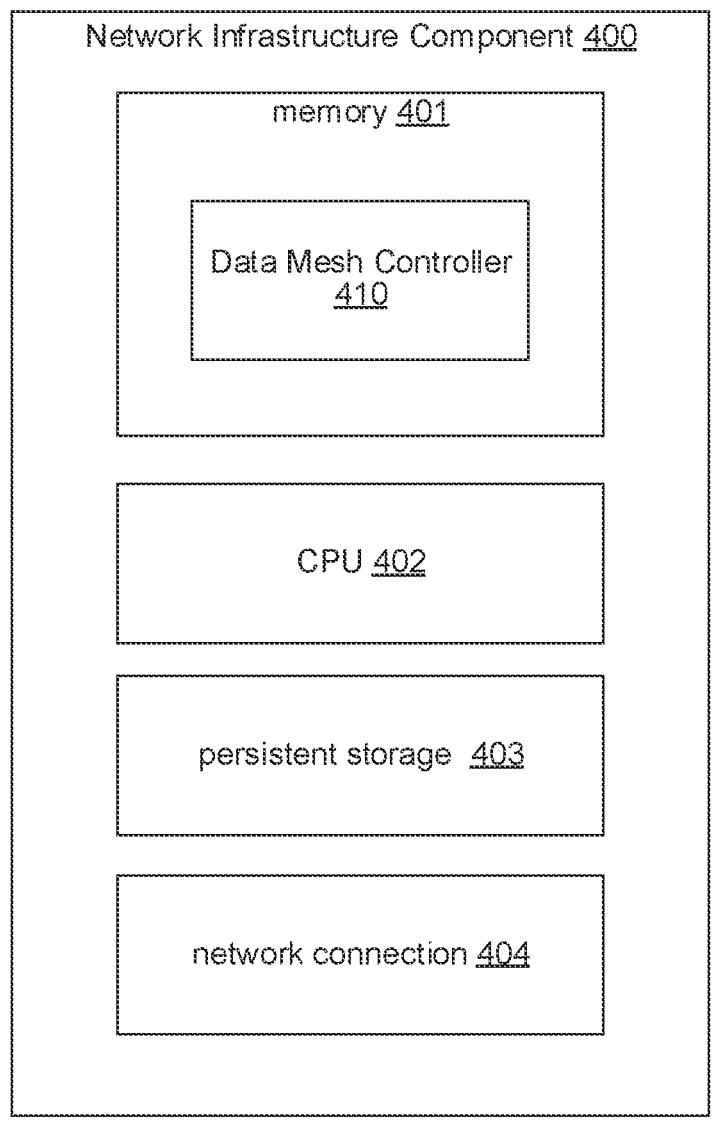
FIG. 4 is a block diagram depicting a network infrastructure component on which at least a portion of the distributed data mesh system may operate, according to various embodiments described herein.

FIG. 4 is a block diagram depicting a network infrastructure component 400 on which at least a portion of the distributed data mesh system may operate, according to various embodiments described herein. The network infrastructure component 400 may be: located on a network in a position to communicate with other network infrastructure components and user device, in order to perform at least part of the functions required in managing a mobile network. A plurality of network infrastructure components may each implement a portion of the distributed data mesh system, thus distributing the system across a plurality of network infrastructure components. In various embodiments, the network infrastructure component 400 includes one or more of the following: a computer memory 401, a central processing unit 402, a persistent storage device 403, and a network connection 404. The memory 401 may be used for storing programs and data while they are being used, including data associated with the various network infrastructure components and the network infrastructure component 400 (not shown), an operating system including a kernel (not shown), and device drivers (not shown). The central processing unit (CPU) 402 may be used for executing computer programs (not shown). The persistent storage device 403 may be a hard drive or flash drive for persistently storing programs and data. The network connection 404 may be used for connecting to one or more network infrastructure components or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals from network infrastructure components, or other network functions, and for connecting to one or more computer devices such as network infrastructure components or other computer systems. In various embodiments, the network infrastructure component 400 additionally includes input and output devices, such as a keyboard, a mouse, display devices, etc.

While a network infrastructure component 400 configured as described may be used in some embodiments, in various other embodiments, the network infrastructure component 400 may be implemented using devices of various types and configurations, and having various components. The memory 401 may include a data mesh controller 410 which contains computer-executable instructions that, when executed by the CPU 402, cause the network infrastructure component 400 to perform the operations and functions described herein. For example, the programs referenced above, which may be stored in computer memory 401, may include or be comprised of such computer-executable instructions. The memory 401 may also include a network infrastructure component data structure.

The data mesh controller 410 performs the core functions of the network infrastructure component 400, as discussed herein and also with respect to FIGS. 2, 3, and 5-10. In particular, the data mesh controller 410 facilitates the management of data produced, consumed, stored, or otherwise used or accessible by the distributed data mesh system.

Additionally, the data mesh controller 410 may allow the network infrastructure controller to provide a microservice, data product, etc., to another network infrastructure controller, allow the network infrastructure controller to enforce data governance rules, perform audits, etc., of data produced by, stored on, used by, etc., other network infrastructure controllers, and perform other functions to manage the distributed data mesh system as described herein.

In an example embodiment, the data mesh controller 410 or computer-executable instructions stored on memory 401 of the network infrastructure component 400 are implemented using standard programming techniques. For example, the data mesh controller 410 or computer-executable instructions stored on memory 401 of the network infrastructure component 400 may be implemented as a "native" executable running on CPU 402, along with one or more static or dynamic libraries. In other embodiments, the data mesh controller 410 or computer-executable instructions stored on memory 401 of the network infrastructure component 400 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the network infrastructure component 400.

In addition, programming interfaces to the data stored as part of the data mesh controller 410 can be available by standard mechanisms such as through C, C++, C #, Java, and web APIs; libraries for accessing files, databases, or other data repositories; through scripting languages such as JavaScript and VBScript; or through Web servers, FTP servers, or other types of servers providing access to stored data. The data mesh controller 410 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the network infrastructure component 400 and network infrastructure components.

Furthermore, in some embodiments, some or all of the components/portions of the data mesh controller 410, or functionality provided by the computer-executable instructions stored on memory 401 of the network infrastructure component 400 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The operation of certain aspects will now be described with respect to FIGS. 5-10. In at least one of various embodiments, processes 500, 600, 700, 800, 900, and 1000 described in conjunction with FIGS. 5-10, respectively, may be implemented by one or more processors or executed via circuitry on one or more computing devices, such as the network infrastructure component 400 described in connection with FIG. 4, the distributed data mesh system 250 described in connection with FIG. 2, or other computing devices.

Figure 5:
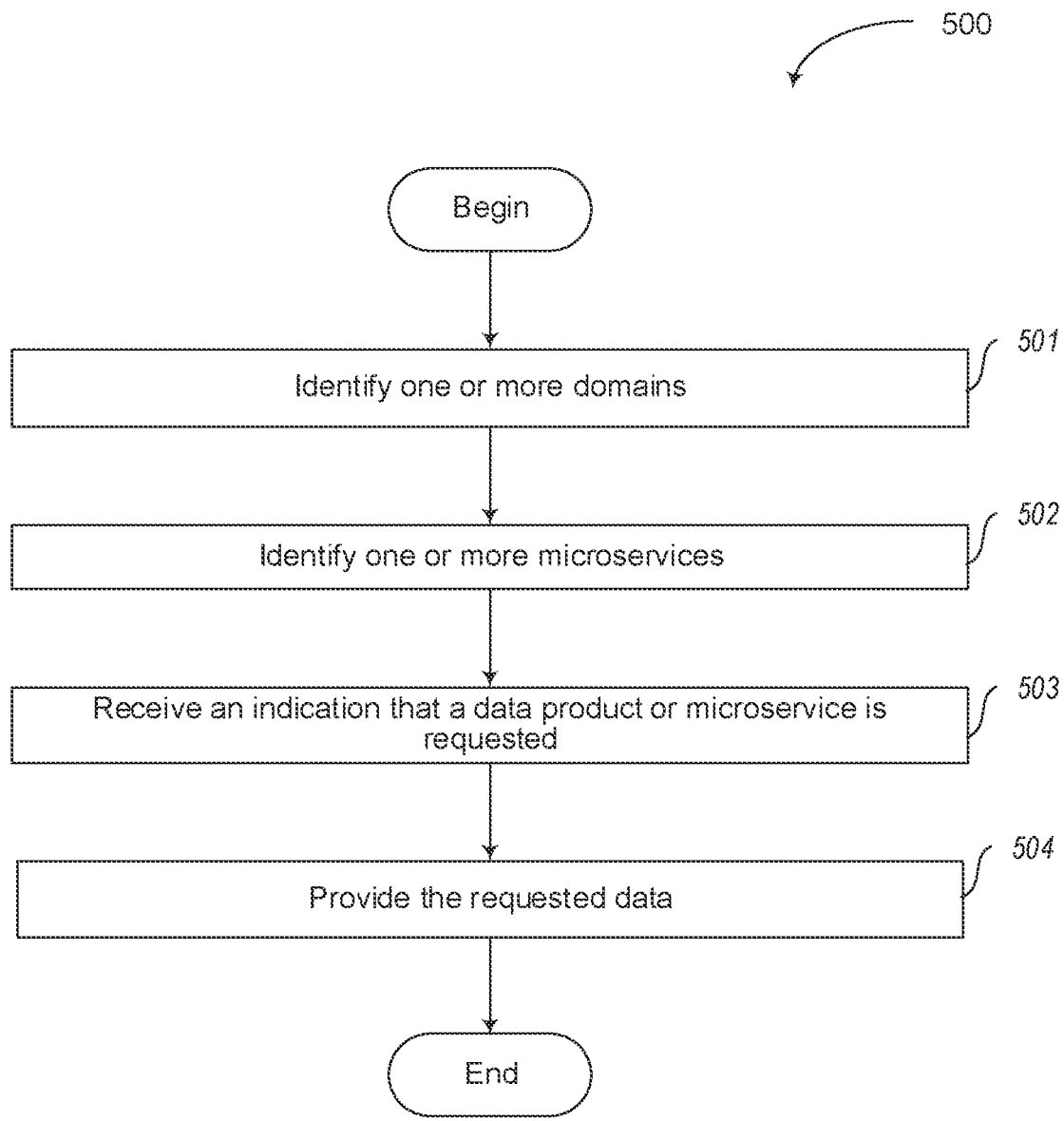
FIG. 5 is a flow diagram depicting a process to implement a distributed data mesh for a network by providing data products or microservices to network infrastructure components, according to various embodiments described herein.

FIG. 5 is a flow diagram depicting a process 500 to implement a distributed data mesh for a network by providing data products or microservices to network infrastructure components, according to various embodiments described herein. The process 500 begins, after a start block, at act 501, where the distributed data mesh system identifies one or more data domains, each data domain including at least one data product. In some embodiments, the distributed data mesh system performs act 501 by using a crawler. The distributed data mesh system may perform act 501 by using the process described below in connection with FIG. 7.

The process 500 continues to act 502, where the distributed data mesh system identifies one or more microservices included within one or more data products. The distributed data mesh system may identify the mciroservices based on information received from the one or more data products.

The process 500 continues to act 503, where the distributed data mesh system receives an indication that data or microservice included in at least one data product is requested by a device. The process 500 continues to act 504, where the distributed data mesh system provides the requested data by applying the request to the at least one data product. The distributed data mesh system may apply the request to a data product by causing the data product to consume data associated with the request and to apply one or more applications or microservices included in the data product to the consumed data. The distributed data mesh system may receive the requested data from a publishing port of the at least one data product, and may cause the requested data to be transmitted to the device. The distributed data mesh system may perform act 504 without moving the at least one data product or its contents to another device.

After act 504, the process ends.

Figure 6:
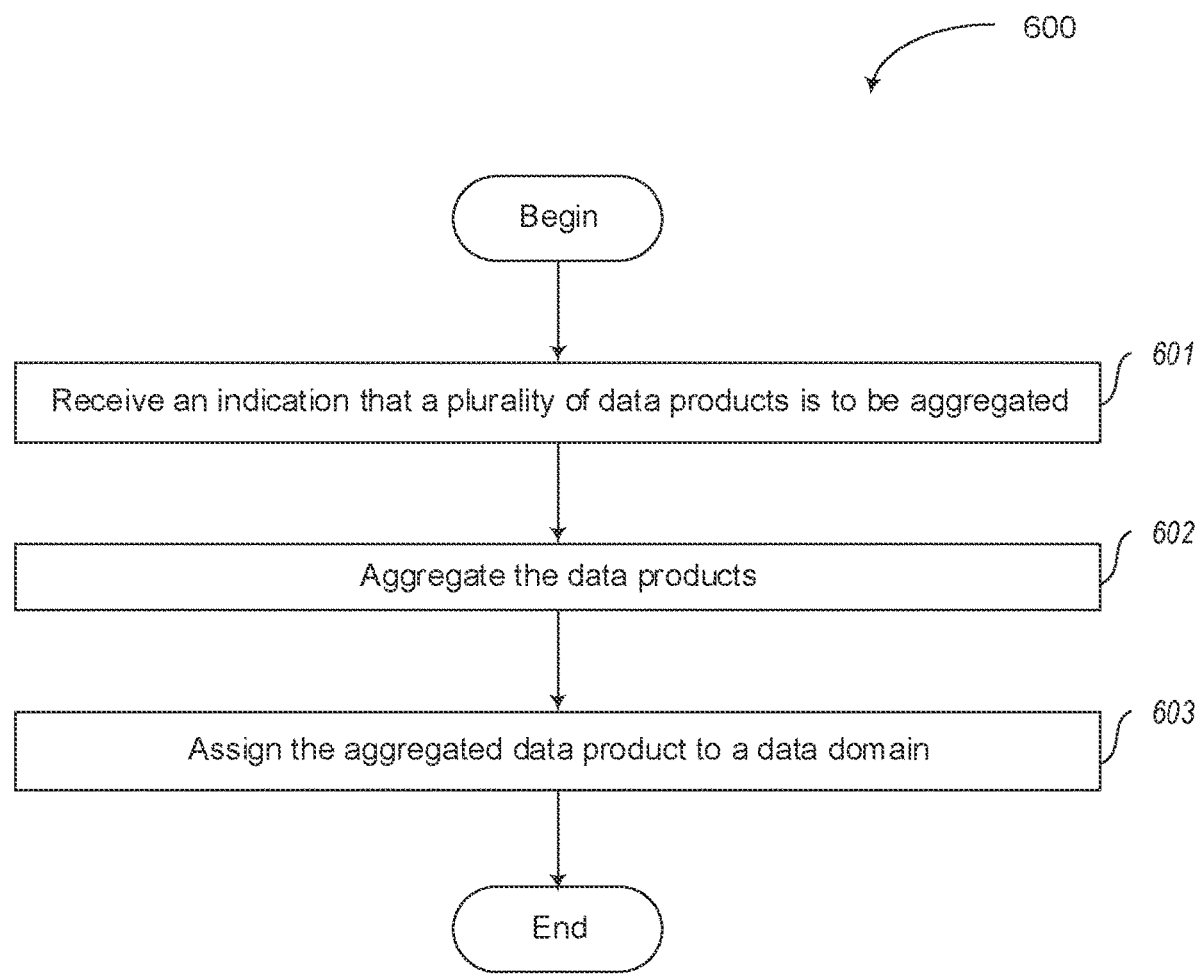
FIG. 6 is a flow diagram depicting a process to aggregate data products identified in one or more domains, according to various embodiments described herein.

FIG. 6 is a flow diagram depicting a process 600 to aggregate data products identified in one or more domains, according to various embodiments described herein. The process 600 begins, after a start block, at act 601, where the distributed data mesh system receives an indication that a plurality of data products present in one or more domains are to be aggregated.

Next, at act 602, the distributed data mesh system aggregates the data products to generate an aggregated data product. In some embodiments, the distributed data mesh system aggregates the data products based on one of more of: instructions from a user, such as a data engineer; a measure of the compatibility between one or more of microservices, applications, or data included in the data products; an indication that data received from the publishing ports of two or more data products is typically aggregated; and other information used to aggregate data products. For example, the distributed data mesh system, via a data engineer, the crawler, or other tools or methods to analyze data use, may recognize that devices typically receive a particular type of data from each of two different data products, and that these devices combine the data received from the data products in some manner. The distributed data mesh system may then identify how the data from each of the data products is combined, and create a new data product which is configured to provide the combination of the data received from the two data products.

The process 600 continues to act 603, where the distributed data mesh system assigns the aggregated data product to a data domain. In some embodiments, the distributed data mesh system assigns the aggregated data product to a data domain based on the data domains associated with the plurality of data products. The aggregated data product may be assigned to a data domain which does not include any of the plurality of data products. The aggregated data product may be assigned to a data domain which includes at least one data product of the plurality of data products.

After act 603, the process ends.

Figure 7:
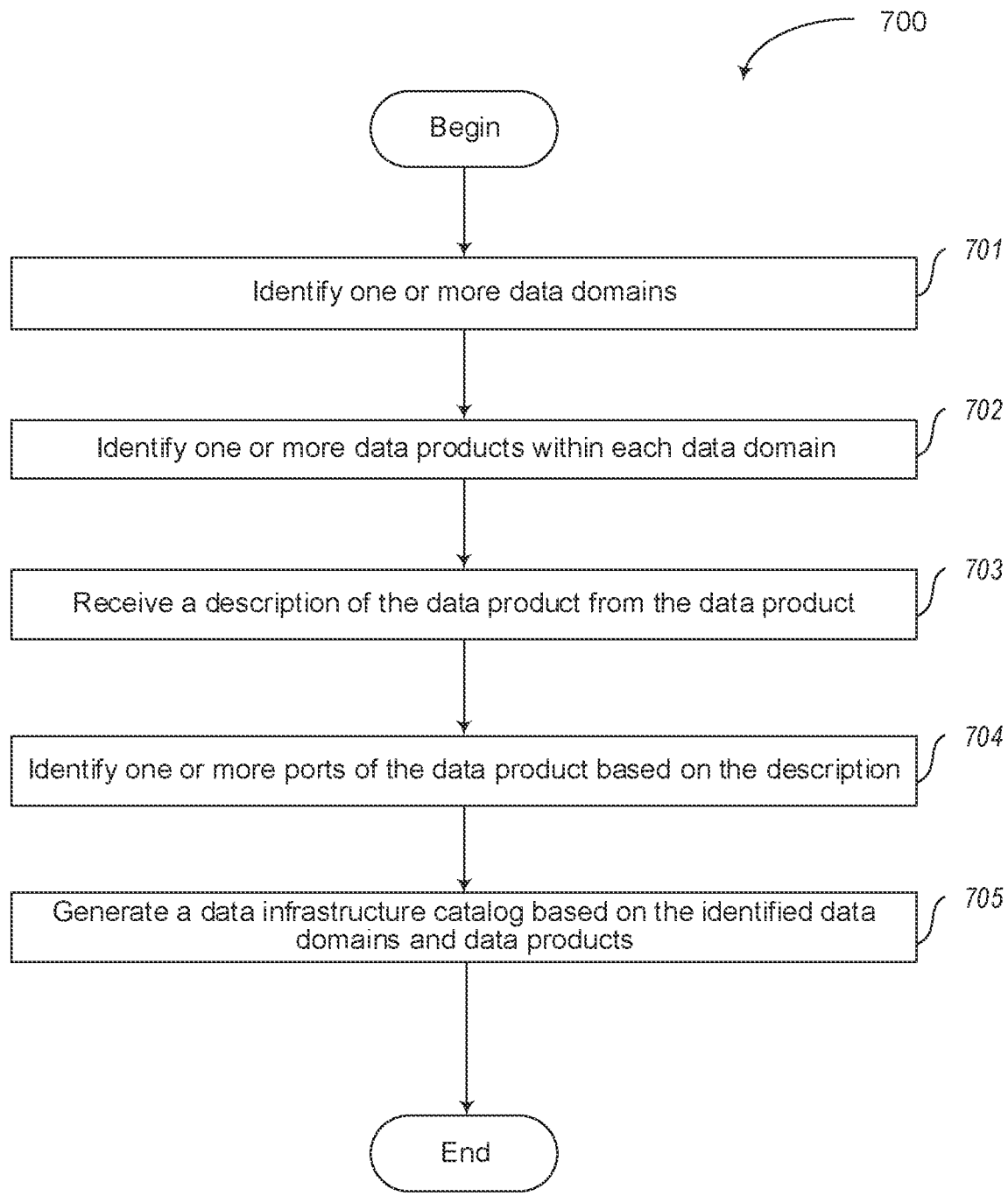
FIG. 7 is a flow diagram depicting a process to use a crawler to build a data infrastructure catalog, according to various embodiments described herein.

FIG. 7 is a flow diagram depicting a process 700 to use a crawler to build a data infrastructure catalog, according to various embodiments described herein. The process 700 begins, after a start block, at act 701, where the distributed data mesh system causes a crawler to identify one or more data domains included in a network, such as a network 200.

Process 700 continues to act 702, where the crawler is caused to identify one or more data products within each data domain. Next, at act 703, the crawler receives a description of the data product from the data product. In some embodiments, at act 703, the crawler receives the description of the data product from the self-describe port of the data product.

Process 700 continues to act 704, where the crawler is caused to identify one or more ports of the data product based on a description of the data product. In some embodiments, the crawler is configured to "inject" code into a data product to identify applications, data, microservices, ports, or other aspects of the data product, are included in the data product. The crawler may identify the one or more ports of the data product based on the injected code and the description of the data product. In some embodiments, at act 704, the crawler obtains information describing other aspects of the data product, such as the applications, data, microservices, or other aspects of the data product.

Process 700 continues to act 705, where the distributed data mesh system generates a data infrastructure catalog based on the identified data domains and data products. In some embodiments, if a data infrastructure catalog already exists, the distributed data mesh system updates the existing data infrastructure catalog at act 705 instead of generating a data infrastructure catalog. In some embodiments, one or more templates for data, information, requests, etc., provided to a data product are generated based on at least one or more of the identified data domains, the identified data products, the description of the data product, the ports of the data product, information received regarding the data product from one or more data engineers, or other information regarding the data product.

After act 705, the process 700 ends. In some embodiments, the distributed data mesh system causes the process 700 to be performed multiple times. By performing the process 700 multiple times, the distributed data mesh system is able to ensure that the data infrastructure catalog includes accurate information regarding data products and data domains. In some embodiments, the distributed data mesh system uses methods other than a crawler to access receive information regarding each data product and data domain on the network, such as receiving an indication from one or more devices regarding the contents of a data product or data domain when the device interacts with, modifies, creates, changes, etc., a data product.

Figure 8:
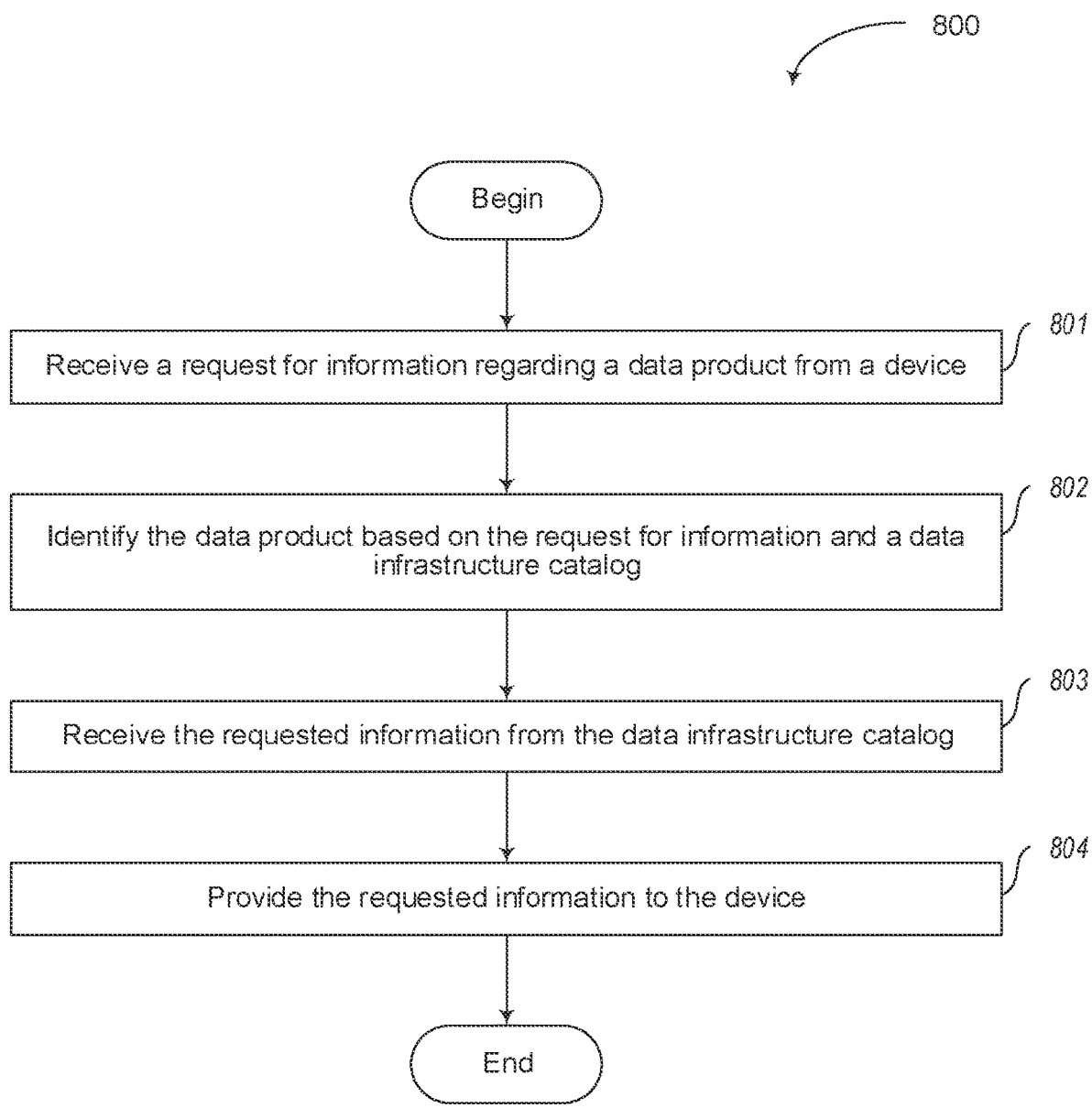
FIG. 8 is a flow diagram depicting a process to provide information regarding a data product to a device, according to various embodiments described herein.

FIG. 8 is a flow diagram depicting a process 800 to provide information regarding a data product to a device, according to various embodiments described herein. The process 800 begins, after a start block, at act 801, where the distributed data mesh system receives a request for information regarding data product from a device. The information requested may include one or more of: information regarding the data stored by the data product; information regarding the ports used by the data product, including data formats which are accepted at each data port; information regarding the microservices used by the data product; and other information regarding a data product. In some embodiments, the request for information includes an indication of one or more data products related to the requested information. In some embodiments, the request for information does not include an indication of one or more data products related to the requested information. In some embodiments, the requested information include one or more templates for interacting with the data product.

The process 800 continues to act 802, where the distributed data mesh system identifies a data product based on the request for information and a data infrastructure catalog. Next, at act 803, the distributed data mesh system receives the requested information from the data infrastructure catalog based on the identified data product.

The process 800 continues to act 804, where the distributed data mesh system provides the requested information to the device which requested the information.

After act 804, the process 800 ends.

Figure 9:
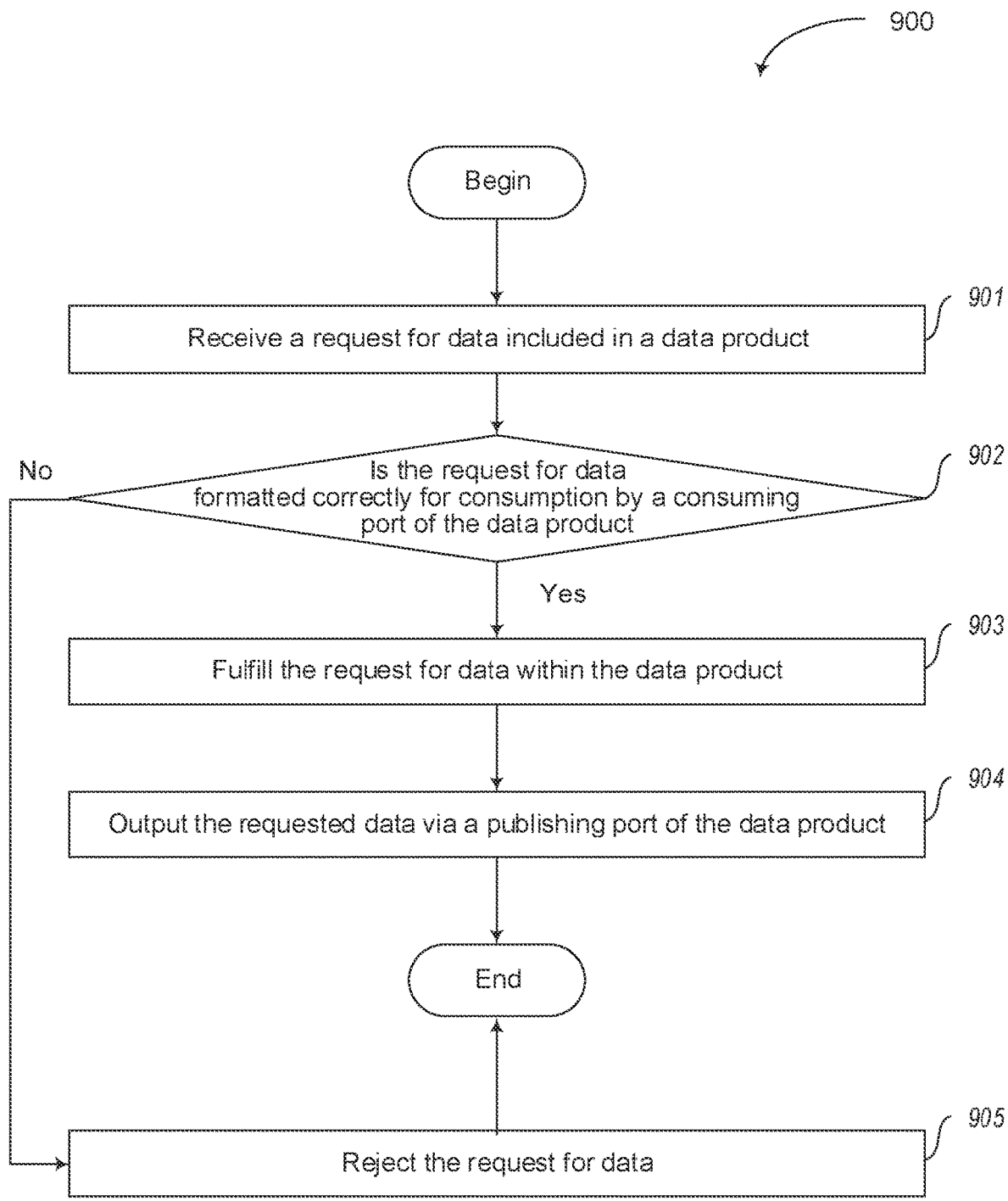
FIG. 9 is a flow diagram depicting a process for providing a request for data to a data product, according to various embodiments described herein.

FIG. 9 is a flow diagram depicting a process 900 for providing a request for data to a data product, according to various embodiments described herein. The process 900 begins, after a start block, at act 901, where the distributed data mesh system receives a request for data included in a data product from a device. In some embodiments, the request for data is formatted based on one or more templates for the data product. The device may access the one or more templates from a data infrastructure catalog.

Next, at act 902, the distributed data mesh system determines whether the request for data is formatted correctly for consumption by a consuming port of the data product. The distributed data mesh system may determine whether the request for data is formatted correctly based on one or more protocols used by the consuming port of the data product. If the request is formatted correctly, the process 900 continues to act 903.

At act 903, the distributed data mesh system fulfills the request for data within the data product. The distributed data mesh system may perform act 903 by causing the data product, a device associated with the data product, the device that provided the request for data, or another device, to apply one or more applications or microservices to the request for data.

The process 900 continues next to act 904, where the distributed data mesh system outputs the requested data through a publishing port of the data product. The distributed data mesh system may perform act 904 by causing the data product, a device associated with the data product, the device that provided the request for data, or another device to output the requested data. In some embodiments, the distributed data mesh system formats the requested data based on one or more protocols used by the publishing port of the data product. In some embodiments, when a device requests data which requires data or processing by multiple data products, the distributed data mesh system provides the published data to a second data product.

After act 904, the process 900 ends.

At act 902, if the request is not formatted correctly, the process 900 continues to act 905. At act 905, the distributed data mesh system rejects the request for data. In some embodiments, the distributed data mesh system may transmit an indication to the device that the request for data was rejected.

After act 905, the process 900 ends.

Figure 10:
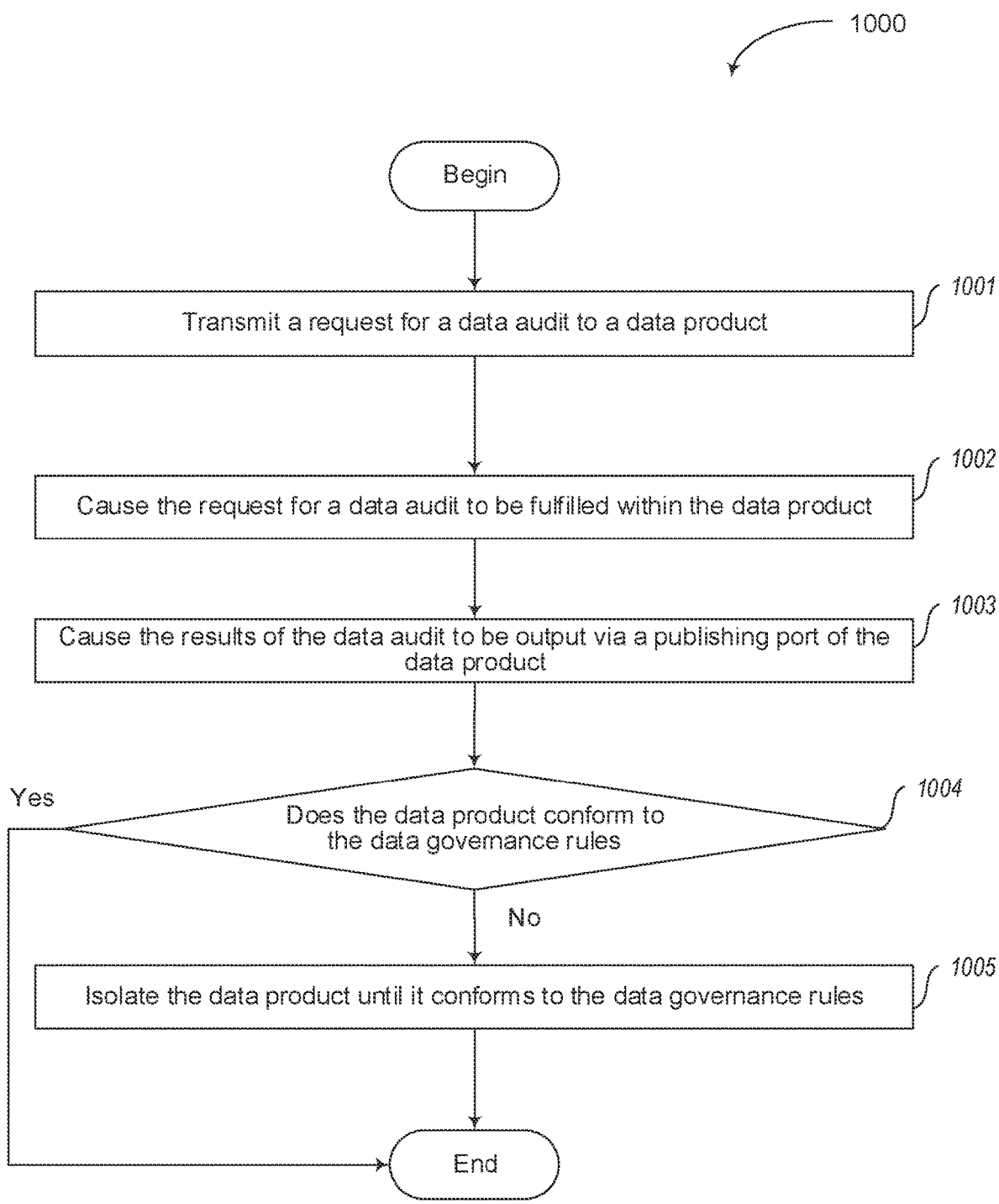
FIG. 10 is a flow diagram depicting a process for performing a data audit of a data product, according to various embodiments described herein.

FIG. 10 is a flow diagram depicting a process 1000 for performing a data audit of a data product, according to various embodiments described herein. The process 1000 begins, after a start block, at act 1001, where a request for a data audit is transmitted to the audit port of the data product. A crawler may transmit the request to the data product. In some embodiments, the request for a data audit includes code which is injected into the data product through the audit port.

The process 1000 continues to act 1002, where the data product is caused to fulfill the data audit within the data product based on the request for the data audit. In some embodiments, the data product is caused to fulfill the data audit by using or accessing one or more applications, one or more microservices, data included in the data product, or other aspects of the data product. The process 1000 continues to act 1003, where the data product is caused to output the results via a publishing port of the data product.

The process 1000 continues to act 1004, where the distributed data mesh system determines whether the data product conforms to data governance rules, such as the data governance rules 205 described above in connection with FIG. 2. If the data product conforms to the data governance rules, the process ends. If the data product does not conform to the data governance rules the process continues to act 1005.

At act 1005, the distributed data mesh system isolates the data product until the data product conforms to the data governance rules. In some embodiments, the distributed data mesh system isolates a portion of the data product. The distributed data mesh system may isolate the data product by causing one or more devices on the network to be unable to access the data product. In some embodiments, the distributed data mesh system causes the data product to conform to the data governance rules, such as by changing the data product based on the results of the audit, causing a data engineer to be alerted that the data product does not conform to the data governance rules, or other methods of causing the data product to conform to the data governance rules. For example, if the distributed data mesh system determines, based on the audit, that data for the data product is stored in multiple different data pools, the distributed data mesh system may cause the data product to conform to the data governance rules by causing the data for the data product to be moved to a single data pool.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   at least one processor; and
   at least one memory coupled to the at least one processor, the memory having computer-executable instructions stored thereon that, when executed by the at least one processor, cause the system to:
   identify a plurality of data domains within a telecommunications network, wherein data associated with each respective data domain of the plurality of data domains within the telecommunications network is stored within a data pool of a plurality of data pools associated with the telecommunications network, and each respective data domain indicates one or more network components of the telecommunications network;
   for each respective data domain of the plurality of data domains:
   identify at least one data product associated with the respective data domain, the at least one data product being stored within the data pool that stores the respective data domain and the data included in the data product being related to at least one network component of the telecommunications network indicated by the respective data domain of the telecommunications network;
   identify one or more microservices included in the at least one data product that control access to data related to the at least one network component; and obtain, from the at least one data product, information defining the at least one data product, the information defining the at least one data product including information regarding one or more microservices included in the at least one data product, the information regarding one or more microservices including an indication of one or more operations performed by the one or microservices;

receive an indication that data associated with a first network component of the telecommunications network that is associated with a data product of the at least one data product is to be accessed by a computing device associated with a second network component the telecommunication network;

cause, based on the information defining the data product, the computing device to provide first data to the data product;

cause the data product to apply the first data to at least one microservice included in the data product and generate a response to the computing device based on the application of the first data to the at least one microservice, the response including data associated with the telecommunication network; and transmit the generated response to the computing device without moving the data product outside of the data pool within which the data product is stored.

2. The system of claim 1, wherein the computer-executable instructions, when executed by the at least one processor further cause the system to:

receive an indication that a second computing device associated with the respective data domain of the plurality of data domains has generated second data associated with the data product included in the respective data domain; and cause the generated second data to be stored within the respective data pool that stores the respective data domain.

3. The system of claim 2, wherein the computer-executable instructions, when executed by the at least one processor to cause the generated second data to be stored within the respective data pool that stores the data domain, further cause the system to:

prevent the generated second data from being stored within a data pool that is not the respective data pool.

4. The system of claim 1, wherein the computer-executable instructions, when executed by the at least one processor to identify the at least one data product associated with the respective data domain, further cause the system to:

cause a crawler to access the respective data domain and to locate data products within the respective data domain; and receive an indication of the at least one data product being located in the respective data domain by the crawler.

5. The system of claim 4, wherein the computer-executable instructions, when executed by the at least one processor to obtain the information defining the at least one data product, further cause the system to:

for each respective data product of the at least one data product:

employ the crawler to identify a publishing port of the data product; and employ the crawler to identify a consumption port of the data product.

6. The system of claim 4, wherein the computer-executable instructions, when executed by the at least one processor to identify the at least one data product associated with the respective data domain, further cause the system to:

for each respective data product of the at least one data product:

receive, via the crawler, information from the data product describing contents of the data product.

7. The system of claim 4, wherein the computer-executable instructions, when executed by the at least one processor to identify the at least one data product associated with the respective data domain, further cause the system to:

for each respective data product of the at least one data product:

employ the crawler to audit the data product to ensure that the data product and the contents of the data product conform to one or more standards.

8. The system of claim 1, wherein each data domain of the one plurality of data domains represents one or more of:

a network slice;

a radio access network for a pre-defined geographic area;

a telecommunication network function; and a roaming telecommunication network.

9. The system of claim 1, wherein the computer-executable instructions, when executed by the at least one processor further cause the system to:

generate, based on the information defining at least a portion of the data products included in the plurality of data domains, a data catalog; and cause the data catalog to be accessible to the computing device.

10. A method in a wireless cellular network, the method comprising:

identifying a plurality of data domains within the wireless cellular network, wherein data associated with each respective data domain of the plurality of data domains indicates data which is stored within a respective data pool of a plurality of data pools associated with the wireless cellular network, and each respective data domain relating to one or more network components;

for each respective data domain of the plurality of data domains:

identifying at least one data product associated with the respective data domain, the data product being stored within the data pool that stores the respective data domain and the data included in the data product being related to at least one network component of the one or more network components related to the respective data domain of the wireless cellular network;

identifying one or more microservices included in the at least one data product that control access to data included in the at least one data product; and obtaining, from the at least one data product, information defining the at least one data product, the information defining the at least one data product including information regarding one or more microservices included in the at least one data product;

receiving an indication that a data associated with a network component of the telecommunications network associated with data product of the at least one data product is to be accessed by a computing device associated with the wireless cellular network;

causing, based on the information defining the data product, the computing device to provide first data to the data product;

causing the data product to apply the first data to at least one microservice included in the data product and generate a response to the computing devices based on the application of the first data to the at least one microservice, the response including data associated with the wireless cellular network; and transmitting the generated response to the computing device without moving the data product outside of the data pool within which the data product is stored.

11. The method of claim 10, further comprising:

receiving an indication that a second computing device associated with the respective data domain of the plurality of data domains has generated second data associated with the data product included in the respective data domain;

causing the generated second data to be stored within the respective data pool that stores the data domain; and preventing the generated second data from being stored within a data pool which is not the respective data pool.

12. The method of claim 10, further comprising:

causing a crawler to access the data domain, and to locate data products within the data domain; and receiving, via the crawler, an indication of the at least one data product being located in the respective data domain by the crawler.

13. The method of claim 12, further comprising:

for each respective data product of the at least one data product:

employing the crawler to identify publishing port of the data product; and employing the crawler to identify a consumption port of the data product.

14. The method of claim 10, further comprising:

generating, based on the information defining at least a portion of the data products included in the plurality of data domains, a data catalog; and causing the data catalog to be accessible to the computing device.

15. A non-transitory processor-readable storage medium that stores at least one of instructions or data, the instructions or data, when executed by at least one processor, cause the at least one processor to:

identify a plurality of data domains within a telecommunications network, wherein data associated with each respective data domain of the plurality of data domains is stored within a data pool of a plurality of data pools associated with the telecommunications network, and each respective data domain being associated with one or more network infrastructure components;

for each respective data domain of the plurality of data domains:

obtain, from at least one data product stored in the data pool associated with the respective data domain, information regarding the at least one data product, the information defining the at least one data product including information regarding one or more microservices included in the at least one data product, the data included in the data product being related to at least one network infrastructure component of the one or more network infrastructure components associated with the respective data domain of the telecommunications network;

receive, from a computing device associated with the telecommunications network, a request to access data associated with a network infrastructure component associated with a data product of the at least one data product;

receive first data from the computing device based on the information regarding the data product;

cause the data product to apply the first data to at least one microservice included in the data product and generate a response to the computing device based on the application of the first data to the at least one microservice, the response including data associated with the telecommunications network; and transmit the generated response to the computing device without moving the data product outside of the data pool within which the data product is stored.

16. The non-transitory processor-readable storage medium of claim 15, wherein the computer-executable instructions, when executed by the at least one processor to obtain the information regarding the at least one data product, further cause the system to:

cause a crawler to access the respective data domain and to locate data products within the respective data domain; and receive an indication of the at least one data product being located in the respective data domain by the crawler.

17. The non-transitory processor-readable storage medium of claim 16, wherein the computer-executable instructions, when executed by the at least one processor to obtain the information regarding the at least one data product, further cause the system to:

for each respective data product of the at least one data product:

employ the crawler to identify a publishing port of the data product; and employ the crawler to identify a consumption port of the data product.

18. The non-transitory processor-readable storage medium of claim 16, wherein the computer-executable instructions, when executed by the at least one processor to obtain the information regarding the at least one data product, further cause the system to:

for each respective data product of the at least one data product:

receive, via the crawler, information from the data product describing contents of the data product.

19. The non-transitory processor-readable storage medium of claim 16, wherein the computer-executable instructions, when executed by the at least one processor to obtain the information regarding the at least one data product, further cause the system to:

for each respective data product of the at least one data product:

employ the crawler to audit the data product to ensure that the data product and the contents of the data product conform to one or more standards.

20. The non-transitory processor-readable storage medium of claim 15, wherein the at least one processor is further caused to:

generate, based on the information defining at least a portion of the data products included in the plurality of data domains, a data catalog; and cause the data catalog to be accessible to the computing device.

* * * * *